July 21, 1925.

B. D. SMITH 1,546,514

TRAP

Filed Jan. 3, 1924

Inventor
B. D. Smith.
By Mason Fenwick Lawrence.
Attorneys

July 21, 1925.

B. D. SMITH

TRAP

Filed Jan. 3, 1924

Inventor
B. D. Smith.
By Mason Fenwick & Lawrence.
Attorney

Patented July 21, 1925.

1,546,514

UNITED STATES PATENT OFFICE.

BLANCHARD DRAKE SMITH, OF NEW ORLEANS, LOUISIANA.

TRAP.

Application filed January 3, 1924. Serial No. 684,206.

*To all whom it may concern:*

Be it known that I, BLANCHARD D. SMITH, a citizen of the United States, residing at New Orleans, in the parish of Orleans and State of Louisiana, have invented certain new and useful Improvements in Traps; and I do hereby declare the following to be a full, clear, and exact description of the invention, such as will enable others skilled in the art to which it appertains to make and use the same.

This invention relates to animal traps and more particularly to that type of trap having primary and secondary jaws, this type of trap being exemplified in Patent No. 616,172, patented December 20, 1898. Traps of this type, as far as I know, require that one pair of jaws be first set, after which the other pair of jaws may be set. It frequently happens that the first trap or set of jaws which has been set is likely to be sprung during the setting of the other trap or set of jaws with resultant injury to the hands of the trapper. In accordance with the present invention, it is not necessary that the hands be brought into striking range of the jaws in effecting the setting of the same in open position. The arrangement is such that the tensioned members for closing the jaws may be brought into fully tensioned position in a single operation, thus permitting a rapid setting of the trap as a whole. The various features of novelty and invention will appear from the detailed description taken in connection with the accompanying drawings forming part of this specification.

Referring to the drawings.

Figure 1:
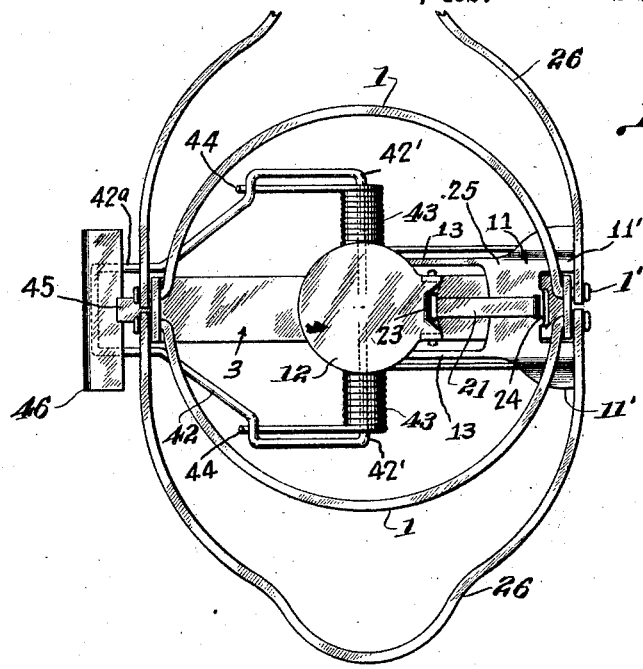
Fig. 1 is a plan view of the preferred form of the invention.

Referring first to the form of the invention shown in Figs. 1 to 4, 3 indicates the base having upturned ends 2 which are perforated to receive shaft-like terminals of bail-like jaws 1 constituting the primary trap. Mounted on extensions 1' of the shaftlike terminals of the jaws 1 are the jaws 26 constituting the secondary trap. It will be noted that the jaws 26 are larger than the jaws 1 and when closed extend some distance above the jaws 1 as clearly indicated in Fig. 3.

Affixed as by spot welding to the base 3 is a plate 39, the plate 39 having laterally extending lugs 40 and 41, the latter extending from the right-angular extension of the plate. A treadle 12 is pivotally mounted on the lugs 41 by means of downwardly-turned legs 20 which are perforated at their ends to extend over the lugs. A sear or finger 21 is pivotally mounted to one of the upstanding lugs 2 as indicated at 22 in a cut out portion in said lug. The free end of the sear is adapted to underlie the treadle between the legs 20 as indicated at 23. The treadle is shown as having a downwardly turned lip beneath which the free end of the sear extends, but this construction is optional, and the arrangement might well be reversed; that is to say, the free end of the sear 21 may be bent up slightly leaving the treadle perfectly flat as will be readily understood by those skilled in the art.

Figure 2:
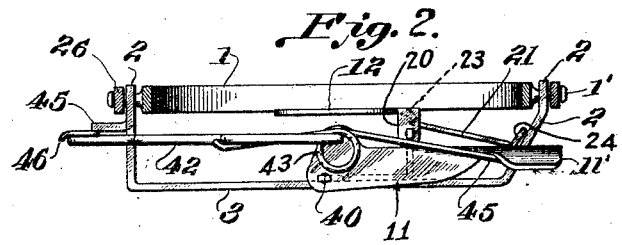
Fig. 2 is a vertical section thereof.
Figure 3:
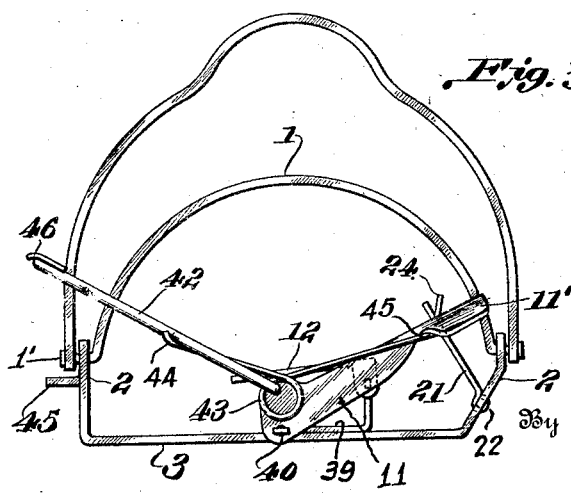
Fig. 3 is a side elevation of the trap showing the position assumed by the parts when the trap has been sprung.
Figure 4:
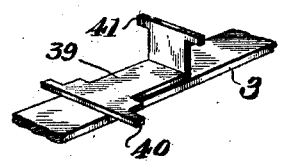
Fig. 4 is a fragmentary detail showing the bracket to which the treadle and one of the tension levers are mounted.
Figure 5:
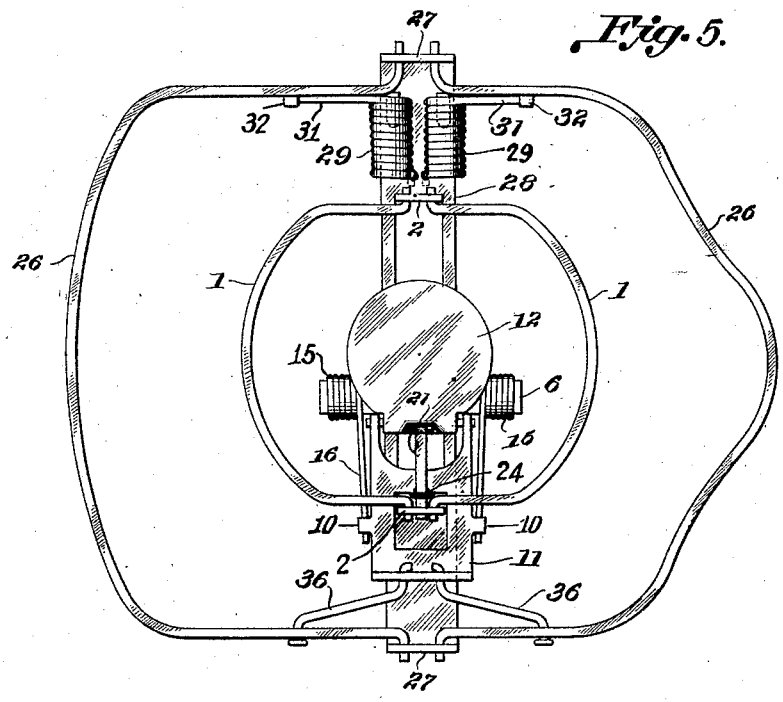
Fig. 5 is a plan view of a modified form of the invention.
Figure 6:
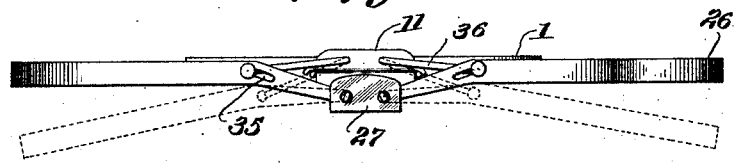
Fig. 6 is an end elevation thereof, the dotted line indicating the range of the swinging movement imparted to the secondary jaws in the operation of setting the trap.
Figure 7:
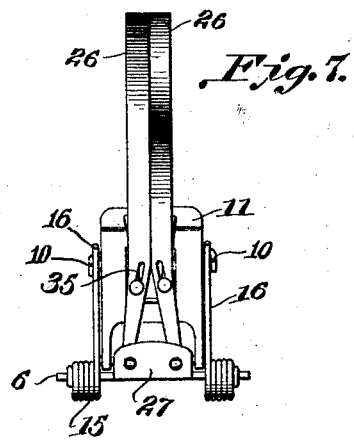
Fig. 7 is an end elevation showing the position assumed by the parts when the trap has been sprung.
Figure 8:
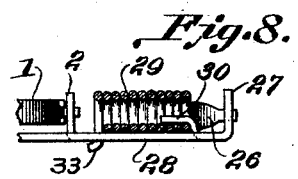
Fig. 8 is a fragmentary detail of one manner of mounting the springs which exert closing action on the secondary jaws.

Pivotally mounted on the lugs 40 is a jaw closing lever generally indicated at 11, the same being provided with side arms 13, the free ends of which are perforated to extend over the lugs 40. The free end of the lever is forked as indicated at 11', the space between the forks being such that the adjacent upstanding lug 2 of the base is freely straddled as indicated in Fig. 2. The forked ends terminate inside of the jaws 26 and outside of the jaws 1. This construction permits the lever to be moved upwardly independently of the jaws 26 but not independently of the jaws 1, these jaws being swung toward each other as the lever moves upwardly, as will be readily understood by reference to Fig. 3.

That part of the lever extending across the side arms 13 at the root of the forks may conveniently be termed the head 25. This head 25 is provided with a struck-up portion 24 between the forks 11' and the struck-up portion is provided with a slot at its root through which slot extends the sear or finger 21. The primary purpose of providing the struck-up part 24 is to enable the slot to be positioned at the most convenient angle for the reception of the finger 21 to prevent binding of the same in the slot. It will now be seen that when the free end of the finger 21 is below or is interengaged with the treadle 12, the lever 11 will be held in fully tensioned position and out of engagement with the jaws 1. It will also be seen that when the lever 11 is swung downwardly, it will positively swing the finger 21 about its pivot and bring the free end thereof into latching engagement with the treadle 12, the free end of the finger first pressing on the down-turned lip of the treadle to swing it aside to permit the finger to pass therebelow. At this point, it may be mentioned that the trap is preferably inverted during the procedure just described by reason of the fact that no spring is provided between the base and the treadle to hold the treadle in its upright position. By holding the trap in inverted position, the finger 21 will swing the trap against the action of gravity, the treadle swinging back into position as the free end of the finger assumes the position between the pivot of the treadle and the down-turned lip thereof, as will be readily understood. When the free end of the finger has assumed the position indicated, the frictional resistance between the treadle and the finger is sufficient to maintain the treadle in set position, it being understood that the lever 11 is tensioned by means presently to be described. The novel combination just described between the treadle and the sear 21 and the lever 11 is an important part of the invention and is intended to be fully set out and claimed in my divisional application filed September 15, 1924, Serial No. 737,945.

For closing the secondary jaws 26, there is provided an arm 42 which at one end is pivoted to a lever 11 eccentrically with respect to the pivot of the latter. This arm 42 is shown in the nature of a bail having its terminals bent into axial alignment as indicated at 42', the side arms 13 of the lever 11 being perforated to pivotally receive the adjacent ends of the said extensions 42'. Each of the shaft-like extensions 42' of the arm 42 supports a coil spring 43, one terminal 44 of the spring being positioned below the adjacent leg of the arm and the other terminal 45 thereof being positioned below the lever 11 underneath down-turned wings extending from the sides of the forks 11'. The respective springs are so tensioned that when free to act the arm 42 and lever 11 may be swung toward each other.

The arm 42 is of a length to extend beyond the adjacent terminal ends of the jaws 26 and has a constricted portion 42ª which will permit the jaws 26 to be closed as the arm swings upwardly. The constricted portion 42ª is preferably bridged by a plate 46 which serves the double function of providing a hand hold for the trapper in swinging the arm 42 below the pivots of the jaws 26 and also serves as the contact member for holding the arm positioned beneath the lateral abutment 45 stamped out of the adjacent lug 2.

It will now be seen that the arm 42 is eccentrically mounted on the lever 11 with respect to the pivot of the latter and that after the arm has been swung below the pivots 1' of the jaws 26, said arm will be bodily shifted by the lever 11 to position the contact plate 46 below the abutment 45 and that when the arm has been so positioned the lever 11 may be swung downwardly against the tension of the springs 43 to permit interengagement between the treadle 12 and the finger 21; also that the free end of the lever 11 is swung down below the pivots of the jaws 1 and that in being so swung down it will positively turn the finger 21 and direct the free end thereof into latching position with the treadle 12. As previously indicated, the trap will be inverted during the setting operation just described. It will also be seen that the latching of the arm 42 with respect to the abutment 45 and the latching of the lever 11 with respect to the treadle is one operation and that the setting of the trap as a whole is therefore very expeditiously accomplished. Furthermore, there is no danger of the jaws 26 being accidentally closed or sprung by the arm 42 while the arm 11 which operates the jaws 1 is being latched.

Referring to the modification shown in Figs. 5 to 8, the same is shown as comprising a base 28 from which are struck up the lugs 2 in which the jaws 1 are pivotally mounted. The jaws 26 are pivotally mounted in lugs 27 which are bent up from the base 28 in spaced relation with respect to the lugs 2, and have springs 29 which tend to swing the jaws 26 toward each other. The springs are in the nature of coil springs supported on the base 28 by means of struck up lugs 30 extending into the coil of the spring, one terminal 31 of the spring extending beneath a lug 32 projecting from the jaw at a point removed from the pivot of the same, the other terminal 33 of the spring extending through a perforation in the base and being bent under to prevent its withdrawal. This manner of mounting the springs permits of ready replacement in the event of breakage.

The jaws 1 are adapted to be swung toward each other by means of the lever generally indicated at 11, this lever differing from that previously described in minor particulars. Cooperating with the lever is a latch 21 which passes through a slot in the base of the upstanding ear 24 the same as in the previously described arrangement. The finger is pivoted to the adjacent lug 2 in any suitable manner and upon the lever 11 being depressed will be positively turned and the free end of the same directed into latching engagement with the treadle 12 as previously explained in connection with the other form of the invention. Projecting from the base 28 are the lateral lugs 6 on each of which is mounted a spring 15, one terminal 16 of the spring being positioned below the lateral lug 10 at the side of the lever 11, the other terminal of the spring being suitably anchored to the lateral lug 6. The tension of both springs 15 is such that when the lever 11 is unrestrained the same will be swung upwardly by the springs to swing the jaws 1 toward each other.

The lever 11 at its free end is provided with an upstanding flange which is perforated to receive one end of a crank-like link 36, there being one link for each jaw 26, the other end of the link being received within a slot 35 in the adjacent end of the jaw 26. The slots 35 are arranged at an angle to the horizontal when the jaws are viewed as in Fig. 6 and are of a length to permit the jaws 21 to be swung to the position indicated in dotted lines, the jaws 26 being swung to the dotted-line position in the operation of effecting cooperative engagement between the sear or finger 21 and the treadle 12.

The operation of setting the trap shown in Figs. 5 to 8 will now be briefly described. The trap is inverted for reasons already indicated in connection with the trap previously described, and the jaws 26 swung open by the hands of the trapper, the swinging of the jaws being continued to the dotted-line position shown in Fig. 6. As the jaws are swung open the links 36 will draw the lever 11 downwardly, which in turn will swing the sear or finger 21 into latching engagement with the treadle 12. After latching engagement between the treadle and the sear 21 has been effected, the jaws 26 are allowed to move back under the action of the springs 29 until further closing movement is prevented by the ends of the slots 35. The trap may now be turned face up and the jaws 1 spread open into the position indicated in Fig. 5. When an animal steps upon the treadle the lever 11 will swing upwardly to close the jaws 1 since they are now unconfined. The jaws 26 will also swing toward each other under the action of the springs 29 and such closing action of the jaws 26 will be practically simultaneous with the closing action of the jaws 1. It is to be noted that inasmuch as the jaws 26 are under constant tension of the springs 29 they will tend to assist or accelerate the upward turning movement of the lever 11 by reason of the link connection between the lever 11 and the jaws 26.

What I claim is:

1. The combination of a trap comprising two sets of jaws constituting a smaller primary trap and a larger secondary trap, a common base on which the traps are mounted, a lateral projection on said base, an arm adapted to be disposed at one of its ends under said projection, and a lever to which the other end of the arm is pivoted, said lever adapted to close the primary trap and being pivoted to said base eccentrically with respect to the pivot of the arm.

2. The combination as specified in claim 1, and a spring exerting a closing action of the arm and lever.

3. In a trap, the combination of a tensioned lever, a pair of jaws adapted to be swung towards each other by said lever, a spring actuated jaw adapted during its opening movement to engage and carry said lever to open or set position.

4. In a trap, the combination of a tensioned lever, a pair of jaws adapted to be swung toward each other by said lever, a spring actuated jaw adapted during its opening movement to engage and carry said lever to open or set position, and releasable means controlled by a treadle for simultaneously locking said tensioned lever and spring actuated jaw in open position.

5. In a trap, the combination of a tensioned lever, a pair of jaws adapted to be swung toward each other by said lever, a secondary pair of jaws with spring actuated means for closing same, said spring actuated means adapted to be brought to open position simultaneously with the opening movement of the tensioned lever, and treadle controlled means actuated by their completed opening movement for releasably locking same.

6. In a trap, the combination with a base, of a lever pivoted on the base, an arm pivoted on the lever, tensioned means acting to swing the lever and arm toward each other, a pair of jaws adapted to be swung toward each other by said lever, a second pair of jaws adapted to be swung toward each other by said arm, and means for impositively locking said lever and arm in position free of said jaws.

7. In a trap, the combination with a base, of a lever pivoted on the base, an arm pivoted on the lever, tensioned means acting to swing the lever and arm toward each other, a pair of jaws adapted to be swung toward each other by said lever, a second pair of jaws adapted to be swung toward each other by said arm, means operatively controlled by the lever to hold the arm impositively locked away from the pair of jaws upon which it is adapted to act, and means including a treadle for holding the lever impositively locked.

8. In a trap, the combination with a base, of a lever pivoted on the base, an arm pivoted on the lever eccentrically with respect to its pivot whereby the arm is shiftable bodily with respect to the base as the lever is turned on its pivot, means effective upon bodily shifting of the arm to hold the same against upward movement with respect to the base, means including a treadle for impositively locking the lever to the base, tensioned means tending to swing the arm and lever toward each other, a pair of jaws adapted to be closed by said lever when the treadle releases the latter, and a pair of jaws adapted to be closed by said arm after the lever has been released by the treadle.

9. In a trap, the combination of a tensioned lever, a pair of jaws adapted to be swung towards each other by said lever, a spring actuated jaw adapted during its opening movement to engage and carry said lever to open or set position.

In testimony whereof I affix my signature.

BLANCHARD DRAKE SMITH.